United States Patent [19]

Basile

[11] 3,815,209
[45] June 11, 1974

[54] INSTALLATION TOOL FOR FLUSH MOUNTED INSERTS

[75] Inventor: Peter A. Basile, Edison, N.J.

[73] Assignee: Amerace Corporation, New York, N.Y.

[22] Filed: May 22, 1973

[21] Appl. No.: 362,769

[52] U.S. Cl. .................................. 29/240, 81/90 C
[51] Int. Cl. ...................... B23p 19/04, B25b 13/00
[58] Field of Search ............ 29/240; 81/90 C, 90 E, 81/180 R

[56] References Cited
UNITED STATES PATENTS

| | | | |
|---|---|---|---|
| 2,448,805 | 9/1948 | Ingram | 81/90 C |
| 2,929,134 | 3/1960 | Mosher | 29/240 |
| 3,408,924 | 11/1968 | Mueller | 81/90 C |

FOREIGN PATENTS OR APPLICATIONS 1,196,287   5/1959   France ........................ 81/90 E Primary Examiner—James L. Jones, Jr.
Attorney, Agent, or Firm—Samuelson & Jacob

[57] ABSTRACT

An installation tool for inserting a panel insert into a panel by rotation and advancement of the insert until the working face of the insert is flush with the outer surface of the panel, the tool having means for assisting the attainment of such a flush relationship and indicating means for signalling the arrival of the working face of the insert in flush relationship with the outer surface of the panel.

17 Claims, 4 Drawing Figures

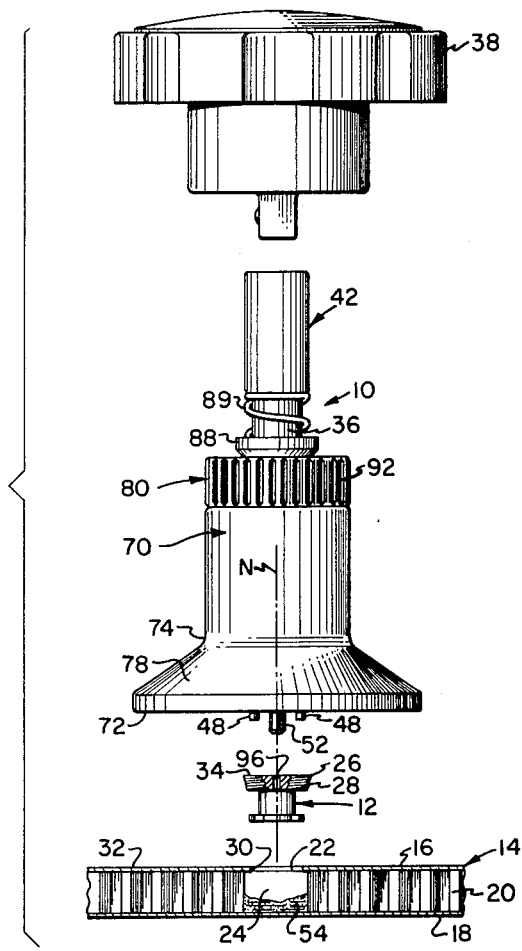

INSTALLATION TOOL FOR FLUSH MOUNTED INSERTS

The present invention relates generally to installation tools and pertains, more specifically, to an installation tool for inserting a panel insert into a panel by rotation and advancement of the insert into the panel until the working face of the insert is flush with the outer surface of the panel.

Screw-threaded inserts have been employed in connection with lightweight panels, such as honeycomb cored panels, where it is necessary to provide some means for either fastening other structural elements to a panel or fastening the panel to another supporting structure. Among those inserts presently available for such use, flush mounted inserts, which are designed to be flush with the outer surface of the panel in which they are installed, have found wide-spread use. Many such inserts are constructed with a threaded exterior surface which engages the panel as the insert is installed within the panel. Such installation requires proper orientation of the insert relative to the panel and then simultaneous rotation and advancement of the insert into the panel until the working face of the insert becomes flush with the outer surface of the panel. It is often difficult for an installer to align the insert properly with respect to the panel and to gage precisely when installation is complete, with the working face of the insert properly located flush with the outer surface of the panel.

It is therefore an object of the invention to provide an installation tool for inserting a panel insert into a panel by rotation and advancement of the insert until the working face of the insert is flush with the outer surface of the panel and which assists in the attainment of such a flush relationship and employs reliable indicating means for signalling the arrival of the working face of the insert in proper flush relationship with the outer surface of the panel.

Another object of the invention is to provide an installation tool of the type described wherein there is provided means for aligning the insert with the panel for a proper flush installation and a positive visual indication that the insert is installed flush with the panel.

Still another object of the invention is to provide an installation tool of the type described wherein the need for operator judgment in determining proper alignment of the insert and subsequent completion of the required installation is minimized in favor of a more exact alignment and indication provided by the tool itself.

A further object of the invention is to provide an installation tool of the type described which can accomplish flush mounting of panel inserts without the necessity of re-driving inserts that have not been installed in proper alignment or to the proper degree of flushness.

A still further object of the invention is to provide a tool of the type described which will operate properly in an environment which includes liquid adhesive in the vicinity of the working face of the insert and the outer surface of the panel.

Yet another object of the invention is to provide a tool of the type described which is simple in construction, easy to use, and versatile.

The above objects, as well as still further objects and advantages, are attained by the invention which may be described briefly as an installation tool for inserting a panel insert into a panel by rotation and advancement of the insert until the working face of the insert is flush with the outer surface of the panel, the tool comprising a driving head rotatable about a given axis and including means for engaging the insert for rotation with the driving head, locating means for positively locating the working face of the insert axially relative to the driving head, a sensing member having a sensing surface for engaging the outer surface of the panel and being mounted for enabling relative axial movement between the driving head and the sensing member between a first position, wherein the sensing surface is spaced axially from the locating means in the direction in which the insert is to be inserted, and a second position, wherein the sensing surface is aligned radially with the locating means so as to correspond to the flush location of the working face of the insert, means enabling rotation of the driving head and simultaneous relative axial movement between the driving head and the sensing member from the first position to the second position, and indicating means for signalling the arrival of the driving head and the sensing member at the second position.

The invention will be more fully understood, while still further objects and advantages thereof will become apparent, in the following detailed description of an embodiment thereof illustrated in the accompanying drawing, in which:

FIG. 1 is an exploded elevational view illustrating an installation tool constructed in accordance with the invention about to be coupled with an insert which is to be installed within a panel;

FIG. 2 is a longitudinal cross-sectional view of the tool of FIG. 1;

FIG. 3 is a fragmentary cross-sectional view, similar to FIG. 2, illustrating the installation tool about to install an insert within a panel; and FIG. 4 is a fragmentary cross-sectional view, similar to FIG. 3, but with the insert installed.

Referring now to the drawing, and especially to FIG. 1 thereof, an installation tool constructed in accordance with the invention is illustrated in the form of a hand-operated tool 10 about to be coupled with a flush mounting panel insert 12 which is to be installed within a panel illustrated in the form of a lightweight honeycomb cored panel 14. Panel 14 includes upper and lower facial sheets 16 and 18, respectively, between which there is sandwiched a honeycomb core 20. An opening 22 in the upper facial sheet 16 will permit the reception of the insert 12 within a cavity 24 in the panel 14. The insert 12 includes an upper flange 26 which is threaded along the outer peripheral surface 28 thereof so as to engage the perimeter 30 of the opening 22 as the insert is installed within the panel 14. Rotation of the insert 12 about an axis N normal to the outer surface 32 of the panel 14 will advance and bring the working face 34 of the insert into flush relationship with the outer surface of the panel.

Turning now to FIG. 2, as well as to FIG. 1, tool 10 has a drive shaft 36 which may be rotated about the given axis N by rotation of a hand wheel 38 affixed to the drive shaft at the upper end 40 thereof by means of a conventional tool socket connection at 42. At the other end 44 of the drive shaft 36 is a driving head 46 which includes means for engaging the insert 12 so that the insert can be rotated with rotation of the drive shaft. These engaging means include a pair of drive pins 48 extending in an axial direction from the driving head 46 for reception in complementary recesses 50 (see FIGS. 3 and 4) in the upper flange 26 of the insert 12. A central locator pin 52 aids in locating the insert 12 relative to the driving head 46 for the reception of the drive pins 48 within the recesses 50.

Locator means are affixed to the driving head 46 for locating the working face 34 of the insert 12 axially relative to the driving head, such locator means being illustrated in the form of a pad 58 affixed to a bushing 60 within the driving head 46, which bushing 60 carries the drive pins 48 and the locator pin 52. The pad 58 has a locating surface 62 which is complementary to the working face 34 of the insert 12 so as to accurately locate the working face of the insert relative to the driving head. Preferably, pad 58 is dimensioned to limit the radial extent of locating surface 62 to no more than approximately the radial extent of working face 34 of the insert so that the locating surface 62 will not interfere with the proper location of insert 12 within the panel 14 during insertion. A magnet 64 is placed within a central bore 66 in the drive shaft 36 and serves as a source for a magnetic circuit which passes through the drive pins 48 and into the insert 12 to secure the insert in place once the insert is engaged with the driving head. The central pin 52, the pad 58 and the bushing 60 are non-magnetic. In addition, since inserts of the type illustrated are installed in the presence of a liquid adhesive 54 within the cavity 24, the pad 58 serves to seal the threaded aperture 56 of the insert 12 to preclude entry of excess liquid adhesive 54 into the aperture 56 and concomitant fouling of the threads within the insert with adhesive. Thus, upon proper engagement of the insert 12 and the driving head 46, the hand wheel 38 may be turned to rotate the drive shaft 36 and drive the insert into the opening 22 to secure the insert within the cavity 24 of the panel 14, as will be described in more detail below.

In order to aid the operator in determining when the desired flush relationship has been attained between the working face 34 of the insert and the outer surface 32 of the panel 14, tool 10 is provided with a sensing member 70 having a sensing surface 72 for engaging the outer surface 32 of the panel 14 and an indicating means which operates in connection with the sensing member 70 to indicate when the sensing surface 72 is aligned radially with the locating surface 62 of the locating pad 58, i.e., the sensing surface 72 is in the same plane P as the locating surface 62, as illustrated in FIG. 2, to thereby provide an indication when the working face 34 of the insert is properly flush with the outer surface 32 of the panel. As best seen in FIGS. 3 and 4, as well as in FIGS. 1 and 2, the generally cylindrical sensing member 70 is mounted upon the drive shaft 36 for rotation about the axis N as well as for axial movement along the drive shaft between an advanced position, as illustrated in FIG. 3, and a retracted position, as illustrated in FIG. 4. In the position illustrated in FIG. 3, the insert 12 is merely placed in an initial position wherein the upper flange 26 is placed in engagement with the upper facial sheet 16, but has not yet been driven into threaded engagement with the opening 22 in the sheet 16. The working face 34 of the insert and the complementary locating surface 62 on the driving head 46 are raised from the outer surface 32 of the upper sheet 16 and the sensing member 70 has been pushed downwardly by the operator, who has gripped the outside surface 74 of the sensing member 70 and has pushed the sensing member downwardly, against the bias of a spring 76 which biases the sensing member upwardly, until the sensing surface 72 is spaced axially from the locating surface 62 in the direction in which the insert will be inserted and comes to rest upon the outer surface 32 of the upper sheet 16 of the panel. The sensing surface 72 extends generally perpendicular to the axis N and, upon coming to rest upon the outer surface 32 of the upper sheet 16, will align the drive shaft 36 normal to the outer surface 32. In this manner, the locating surface 62 is oriented parallel to the outer surface 32 to assure proper alignment of the insert 12 relative to the panel 14 for the desired flush installation. Such alignment of the insert, as well as the gripping and downward movement of the sensing member, is facilitated by the provision of a frusto-conical flared skirt 78 at the lower end of the sensing member, the sensing surface 72 being located at the lowermost portion of the skirt 78.

Immediately above the sensing member 70 is an indicating means which includes an indicator member shown in the form of an annular collar 80 journaled for rotation upon a bushing 82 affixed to the drive shaft 36, the collar 80 being retained against downward axial movement by a rim 84 on the bushing 82. The annular collar 80 is engaged along a surface 86 thereof adjacent the inner diameter of the collar by a complementary surface 87 of a clutch ring 88 which is resiliently biased against the collar by means of a helical spring 89. The frictional forces developed between the clutch ring 88 and the collar 80 at the surface 86 is sufficient to ensure that the collar 80 will rotate with the drive shaft 36 when the sensing member 70 is spaced from the collar 80 in the advanced position illustrated in FIG. 3.

As the drive shaft 36 is rotated and the insert 12 is advanced into the panel 14 by rotation of the driving head 46, the driving head will follow the insert as the insert moves downwardly by virtue of the biasing force exerted by the helical spring 76. As long as the working face 34 of the insert 12 is raised from the outer surface 32 of the panel, the collar 80 will be spaced from upper surface 90 of the sensing member 70 and will rotate with the drive shaft 36. The collar 80 is provided with visible indicating means shown in the form of a multiplicity of vertical striations 92 (see FIG. 1) along the outer perimeter thereof so that the operator may observe that the collar 80 is, in fact, rotating with the drive shaft 36.

When the working face 34 of the insert 12 arrives at the plane of the outer surface 32 of the panel, as illustrated in FIG. 4, the complementary locating surface 62 will be aligned radially with the sensing surface 72 and the upper surface 90 of the sensing member 70 will engage a confronting lower surface portion 94 of the collar 80. The lower surface portion 94 of the collar 80 is located adjacent the outer diameter of the annular collar 80 and the frictional forces established between the engaged surfaces 90 and 94 of the sensing member and the collar establish a frictional torque greater than the frictional torque existing between the engaged surfaces 87 and 86 of the clutch ring 88 and the collar 80. Thus, the impedance to relative rotation between the collar 80 and the drive shaft 36 provided by the clutch ring 88 is overcome once the position illustrated in FIG. 4 is reached and the collar 80 will no longer rotate relative to the sensing member 70 which is held stationary by the operator. In this manner, the operator may observe the cessation of rotation of the collar 80 and thereby determine visually exactly when the insert 12 is located flush with the panel 14.

During installation of the insert 12 in the panel 14, a hydraulic pressure may be generated in the liquid adhesive 54 within the cavity 24. Such pressure can be created where there is a lack of porosity in the core 20 due to the sealing effect of the upper flange 26 of the insert 12. Such hydraulic pressure can make proper insert installation extremely difficult. In order to overcome the problem of excessive hydraulic pressure, a vent hole 96 (see FIG. 1) may be provided in the flange 26 of the insert, allowing excess liquid adhesive 54 to exit through the vent hole, thereby relieving any excessive hydraulic pressure. Installation tool 10 accommodates such vented liquid adhesive 54 by virtue of the radial spacing between the locating surface 62 and the sensing surface 72. Since the locating surface 62 extends radially no further than approximately the radial extent of the working face 34 of the insert 12 and the sensing surface 72 is spaced radially from the locating surface 62, the vented liquid adhesive 54 can accumulate upon the outer surface 32 of the upper facial sheet 16 without interfering with the seating of the sensing surface 72 upon the outer surface 32 or the advancement of the driving head 46 to the position where the insert 12 becomes flush with the outer surface 32. Thus, the radial extent of locating surface 62 coupled with the radial spacing between the locating surface 62 and the sensing surface 72 not only aids in properly aligning axis N normal to the outer surface 32, but further enables driving the insert all the way into proper flush relationship with the panel 14 despite the presence of excess, vented liquid adhesive 54.

Any such excess liquid adhesive 54 which enters the interior 98 of the skirt 78 of the tool may be flushed from the tool by passing an appropriate solvent into the skirt 78. Circulation of that solvent is facilitated by passages 100 in the sensing member 70 and contiguous passages 102 in the collar 80 which passages communicate with the interior 98 of the skirt to enhance such circulation.

Thus, installation tool 10 assures flush installation of insert 12 without guesswork on the part of an operator. Positive means are provided for aligning the insert along the axis N to assure a parallel relationship between the working face 34 of the insert 12 and the outer surface 32 of the upper facial sheet 16. A positive indicator signals the arrival of the insert 12 at the desired flush position.

It is to be understood that the above detailed description of an embodiment of the invention is provided by way of example only. Various details of design and construction may be modified without departing from the true spirit and scope of the invention as defined in the appended claims.

I claim:

1. An installation tool for inserting a panel insert into a panel by rotation and advancement of the insert until the working face of the insert is flush with the outer surface of the panel, said tool comprising:
    a driving head rotatable about a given axis and including means for engaging the insert for rotation with the driving head;
    locating means for positively locating the working face of the insert axially relative to the driving head;
    a sensing member having a sensing surface for engaging the outer surface of the panel and being mounted for enabling relative axial movement between the driving head and the sensing member between a first position wherein the sensing surface is spaced axially from the locating means in the direction in which the insert is to be inserted, and a second position wherein the sensing surface is aligned radially with the locating means so as to correspond to the flush location of the working face of the insert;
    means enabling rotation of the driving head and simultaneous relative axial movement between the driving head and the sensing member from the first position to the second position; and
    indicating means for signalling the arrival of the driving head and the sensing member at the second position.

2. The invention of claim 1 wherein the sensing surface is spaced radially from the locating means and has an area great enough to support the driving head above the outer surface of the panel with said axis in such proper alignment therewith as to assure a properly flush installation.

3. The invention of claim 2 wherein the radial extent of the locating means is no greater than approximately the radial extent of the working face of the insert.

4. The invention of claim 2 wherein the indicating means include:
    an indicator member;
    first means coupling the indicator member with the driving head for impeding relative movement between the indicator member and the driving head when the driving head and the sensing member are at said first position; and
    second means coupling the indicator member with the sensing member at said second position to overcome the impedence of said first coupling means and to impede relative movement between the indicator member and the sensing member, whereby arrival of the driving head and the sensing member at the second position is signalled by cessation of relative movement between the indicator member and the sensing member.

5. The invention of claim 4 wherein the indicator member includes visible indicating means enabling visual observance of said cessation of relative movement between the indicator member and the sensing member.

6. The invention of claim 1 including:
    a drive shaft extending along said axis and carrying said driving head; and
    means on the drive shaft for rotating the drive shaft and the driving head about said axis;
    said sensing member being mounted upon the drive shaft for rotation relative to the drive shaft and for axial movement relative to the drive shaft between an advanced position, wherein the driving head and the sensing member are in said first position, and a retracted position wherein the driving head and the sensing member are in said second position.

7. The invention of claim 6 wherein the sensing surface is spaced radially from the locating means and has an area great enough to support the drive shaft above the outer surface of the panel with said axis generally perpendicular to the sensing surface so as to assure a properly flush installation.

8. The invention of claim 7 wherein the radial extent of the locating means is no greater than approximately the radial extent of the working face of the insert.

9. The invention of claim 7 wherein the indicating means include:
an indicator member mounted for rotation upon the drive shaft in axial alignment with a sensing member;
first means coupling the indicator member with the drive shaft with a first coupling force enabling rotation of the indicator member with the drive shaft when the sensing member is in the advanced position; and
second means coupling the indicator member with the sensing member with a second coupling force sufficient to overcome the first coupling force and permit rotation of the drive shaft relative to the indicator member when the sensing member is in the retracted position whereby arrival of the sensing member at the retracted position is signalled by cessation of rotation of the indicator member relative to the sensing member.

10. The invention of claim 9 wherein the indicator member includes a visible indicator means enabling visual observance of cessation of relative rotation between the indicator member and the sensing member.

11. The invention of claim 9 wherein:
said first means include first friction means on said shaft for frictionally engaging the indicator member at a first surface thereof such that said first coupling force is a frictional force established at said first surface; and
said second means include second frictional means for frictionally engaging a second surface of the indicator member with a complementary surface of the sensing member such that said second coupling force is a frictional force established at said second surface.

12. The invention of claim 11 wherein:
the sensing member is generally cylindrical and extends axially between a first end and a second end, said sensing surface being located at the first end;
the indicator member is mounted upon the drive shaft in juxtaposition with the sensing member and includes a first end and a second end, with the second end of the indicator member confronting the second end of the sensing member;
the first surface of the indicator member is located at a first end thereof and at a first radial position to establish a first frictional torque between the drive shaft and the indicator member;
the second surface of the indicator member is located at the second end thereof and at a second radial position for establishing a second frictional torque between the sensing member and the indicating member; and
said second radial position being located radially beyond the first radial position, relative to the drive shaft, such that the second frictional torque is greater than the first frictional torque when the sensing member is in the retracted position.

13. The invention of claim 12 wherein:
said first friction means include an element mounted on the drive shaft and means resiliently biasing the element toward the first end of the indicator member; and
said second friction means include means resiliently biasing the sensing member toward the second end of the indicator member.

14. The invention of claim 13 wherein the indicator member includes a visible indicating means enabling the visual observance of the cessation of relative rotation between the indicator member and the sensing member.

15. The invention of claim 12 wherein the sensing member includes a skirt located at the first end thereof, said sensing surface being located upon said skirt.

16. The invention of claim 15 wherein the skirt includes a portion flared radially outwardly to space the sensing surface radially from the driving head and the locating means, said skirt providing a hand grip at said flared portion for facilitating movement of the sensing member from the retracted position to the advanced position.

17. The invention of claim 16 wherein the indicator member includes a visible indicating means enabling visual observance of the cessation of relative rotation between the indicator member and the sensing member.

* * * * *